United States Patent [19]

Jansen

[11] Patent Number: 5,488,760
[45] Date of Patent: Feb. 6, 1996

[54] INNER LOCK BAND CLAMP

[75] Inventor: George A. Jansen, Denver, Colo.

[73] Assignee: Band-It-Idex, Inc., Denver, Colo.

[21] Appl. No.: 261,157

[22] Filed: Jun. 17, 1994

[51] Int. Cl.⁶ ............................................. B65D 63/00
[52] U.S. Cl. ................... 24/16 PB; 24/17 AP; 24/20 EE
[58] Field of Search ............................ 24/16 PB, 16 R, 24/17 AP, 20 R, 23 R, 23 B, 20 S, 27, 19, 269, 20 EE

[56] References Cited

U.S. PATENT DOCUMENTS

| | | | |
|---|---|---|---|
| 2,426,731 | 9/1947 | Elliott | 24/16 PB |
| 2,551,384 | 5/1951 | Middleton et al. | 24/20 EE |
| 3,112,496 | 12/1963 | Dritz | 24/17 AP |
| 3,261,062 | 7/1966 | Scarborough, Jr. | 24/19 |
| 3,653,099 | 4/1972 | Hoffman | 24/16 PB |
| 3,660,869 | 5/1972 | Caveney et al. | 24/16 PB |
| 3,909,884 | 10/1975 | Weckesser | 24/16 PB |
| 3,964,133 | 6/1976 | Wasserlein, Jr. | 24/23 R |
| 4,083,086 | 4/1978 | Oetiker | 24/20 R |
| 4,106,799 | 8/1978 | Oetiker | 285/365 |
| 4,222,155 | 9/1980 | Oetiker | 24/20 R |
| 4,272,870 | 6/1981 | McCormick | 24/16 PB |
| 4,333,210 | 6/1982 | Burnett | 24/30.5 R |
| 4,492,004 | 1/1985 | Oetiker | 24/20 R |
| 4,507,828 | 4/1985 | Furutsu | 24/16 PB |
| 4,747,433 | 5/1988 | Dixon | 140/150 |
| 4,887,334 | 12/1989 | Jansen et al. | 24/23 R |
| 4,896,402 | 1/1990 | Jansen et al. | 24/20 R |
| 5,203,786 | 4/1993 | Vernick | 24/20 EE |
| 5,293,668 | 3/1994 | Tibiletti | 24/16 PB |

FOREIGN PATENT DOCUMENTS

| | | | |
|---|---|---|---|
| 563228 | 6/1960 | Belgium . | |
| 7408399 | 12/1975 | Netherlands | 24/23 R |

OTHER PUBLICATIONS

Sales literature, pp. 18–19; two pages, no date is given.
Sales literature, p. 8; one page, no date is given.

*Primary Examiner*—Victor N. Sakran
*Attorney, Agent, or Firm*—Sheridan Ross & McIntosh

[57] ABSTRACT

A clamping device is provided in the form of a cable tie. The cable tie includes a band having a free end for positioning about an object to be constrained, such as an electrical cable, and a buckle through which the free end of the band section is inserted. In a preferred embodiment, the buckle is movably positioned on the band and, during band periphery adjustment, the locking teeth on the band are in an unlocked position. When the desired band periphery is realized, the locking teeth are placed in a locked position. At this point the clamp may be further tightened with a tightening tool.

28 Claims, 6 Drawing Sheets

INNER LOCK BAND CLAMP

FIELD OF THE INVENTION

The present invention relates to a clamping device for various objects and, in particular, to a cable tie for constraining electric cable.

BACKGROUND OF THE INVENTION

A number of fastening or clamping devices have been devised for a variety of purposes. In one application, clamps are used with electrical systems to connect electric shielding or insulation about electric wires, especially about electrical connectors that receive current carrying conductors. Clamps used in such applications are typically referred to as cable ties.

Cable ties generally are of one-piece construction, consisting of a metal or plastic band with a buckle attached rigidly to one end of the band. The free end of the band feeds through the buckle to form a loop enclosing the electrical wires. The buckle typically contains locking teeth or tabs which interlock with slots in the band during band adjustment to retain a desired periphery of the band.

Cable ties typically require mechanical tools to adjust the band periphery due to the force required to pull the band through the buckle. The interlocking of the locking teeth and slots during band adjustment causes friction, thereby significantly restricting the freedom of the band to move through the buckle. The resistance to movement of the band through the buckle is so significant that the resistance often renders adjustment of the band periphery by hand impractical, even when the band periphery is larger than the periphery of the electrical wires to be clamped.

As a result of the interlocking of the locking teeth and slots during band periphery adjustment, minor band periphery adjustments that require the band periphery to be increased, such as the inclusion of additional electrical wires in the bundle of wires to be clamped, generally engender cutting and discarding the cable tie. The interlocking of the locking teeth and band slots during band periphery adjustment makes the adjustments irreversible. Since cable ties typically are not reusable, another cable tie must be employed and the band periphery adjustment process started over again.

Cable ties are generally available only in selected sizes. Objects having an odd size that is both too small and too large for existing cable ties or objects that have a size too large for existing cable ties presently cannot be clamped with a single cable tie. If possible, the object must be separated into one or more smaller objects before clamping can be effectuated by one or more smaller cable ties.

Although cable ties are known and have been used in connection with electric cable or the like, it remains desirable to provide a cable tie that exhibits enhanced engagement characteristics between the band and the buckle. More specifically, there exists a need for a cable tie that promotes the movement of the band through the buckle by reducing the friction between them. Further, there is a need for a cable tie whose periphery can be not only decreased but also increased. Further, there is a need for a cable tie that may clamp objects having an odd size or objects that are too large for existing cable ties. Further, there is a need for tie with a low and smooth profile (e.g., the top of the cable tie has a smooth upper surface with a reduced number of protrusions.)

SUMMARY OF THE INVENTION

A clamping device is provided that includes a band and a buckle for facilitating an adjustment of a band periphery in the clamping device. The band has a first end and a second end with locking teeth located between the first and second ends. The band periphery is adjusted by positioning the buckle on the band and inserting a portion of the band through the buckle to yield a desired band periphery. During band periphery adjustment, the locking teeth are in an unlocked position until the band is adjusted to the desired band periphery. The desired periphery is based on the size of the object to be clamped.

In one embodiment, the band is substantially continuous and includes a slot having a sufficient size and shape to receive at least one of the locking teeth. Generally, the band will include a plurality of slots to engage a plurality of locking teeth.

The locking teeth are generally located near the second end of the band and are at an acute angle relative to the band. The acute angle faces away from the second end to facilitate the engagement of the locking teeth and the slots.

In one embodiment, the buckle is substantially free of locking teeth and is movably positioned on the band. The buckle is typically movably positioned on the band by inserting the band through a passage extending through the buckle.

During positioning of the buckle on the band, the buckle is generally moved along the band to the desired position. In the desired position of the buckle on the band, the locking teeth generally do not contact the band during band periphery adjustment.

In one embodiment, the buckle is moved over a retaining tab during positioning of the buckle on the band. The retaining tab prevents the buckle from moving towards the first end of the band during band periphery adjustment.

After adjustment of the band periphery, the locking teeth are disposed in a locked position, and the buckle is moved to overlap the locking teeth to maintain the locking teeth in a locked position. The second end of the band should have a dimension larger than a corresponding dimension of the passage through the buckle to prevent the second end from passing through the passage and releasing the clamping device.

In one embodiment, the band periphery is further adjusted to a final band periphery after the buckle is moved to overlap the locking teeth. In this embodiment, the locking teeth are disposed in a locked position, the buckle is moved over the locking teeth, and the band is passed through the buckle to the final band periphery. The clearance between a surface of the passage and the locking teeth coupled with the flexibility of the locking teeth enable the band to be moved through the buckle when the buckle is positioned over the locking teeth.

In another embodiment, the clamping device can be removed and later reused. To remove the clamping device, the buckle is located at a distance from the locking teeth. The locking teeth are disengaged to an unlocked position, and the first end of the band is passed through the buckle to unclamp the object.

In another embodiment, the band is in two sections, with the second end being separate from a band section. The second end can be removably connected to the band section to form the band. The band section is cut from a band-forming material to a length sufficient to provide a band having the desired periphery.

The clamping device provides several advantages over existing clamping devices. The clamping device provides improved engagement characteristics by providing more freedom of movement of the band through the buckle than is possible with existing clamping devices. The freedom of movement results from the ability of the locking teeth to be disengaged during band periphery adjustment.

Unlike existing clamping devices, the periphery of the clamping device can also be increased as well as decreased, as desired. The freedom of movement of the band through the buckle permits the band to be passed either forwards or backwards through the buckle.

In one embodiment, the clamping device can be removed from the object being clamped and later reused. In contrast, existing clamping devices are generally not reusable.

In another embodiment, the band includes a band section cut from a band-forming material to provide a clamping device of a desired periphery. Such clamping devices may be provided in a variety of lengths, including odd sizes that are not available in existing clamping devices or sizes that exceed the available sizes of existing clamping devices.

DETAILED DESCRIPTION

Figure 1:
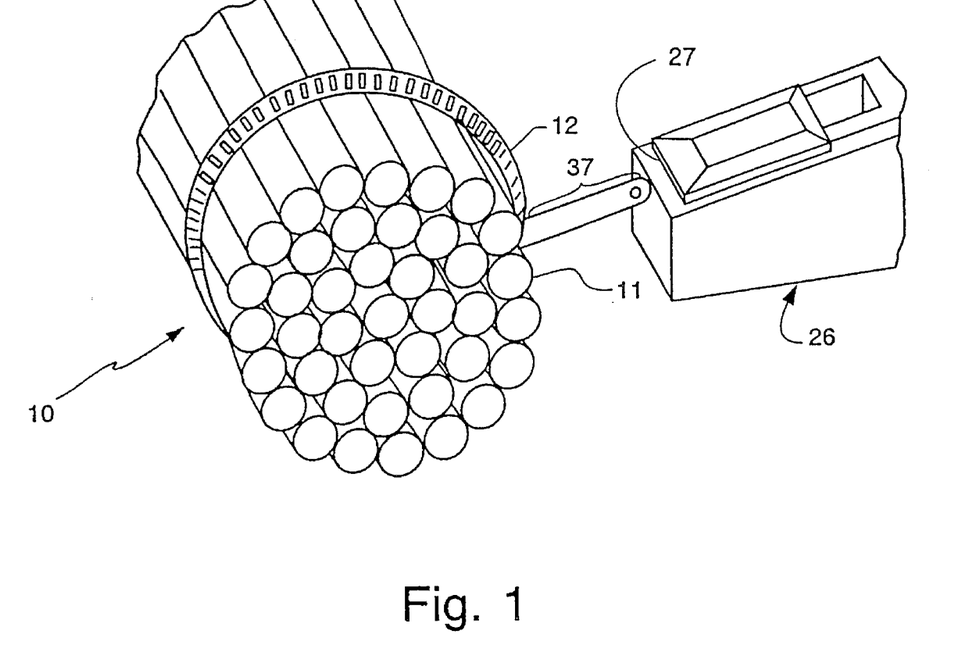
FIG. 1 is a perspective view of the clamping device of the present invention before insertion of a free end of the band into a tightening tool to permit the device to clamp a bundle of electrical wires together.
Figure 2:
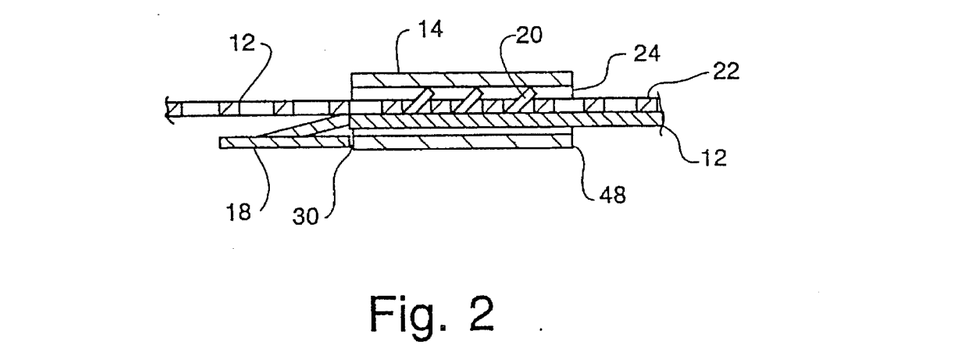
FIG. 2 is a cross-sectional view of the buckle and band of the clamping device when the locking teeth are in a locked position.
Figure 3:
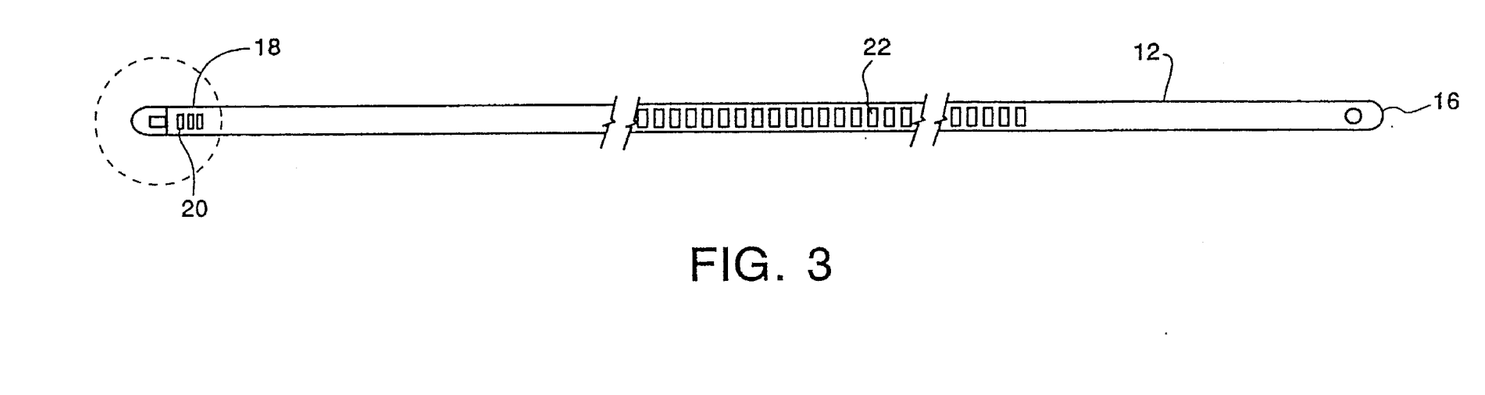
FIG. 3 is a plan view of the band of the clamping device showing the locking teeth, matching slots and retaining tab.
Figure 4:
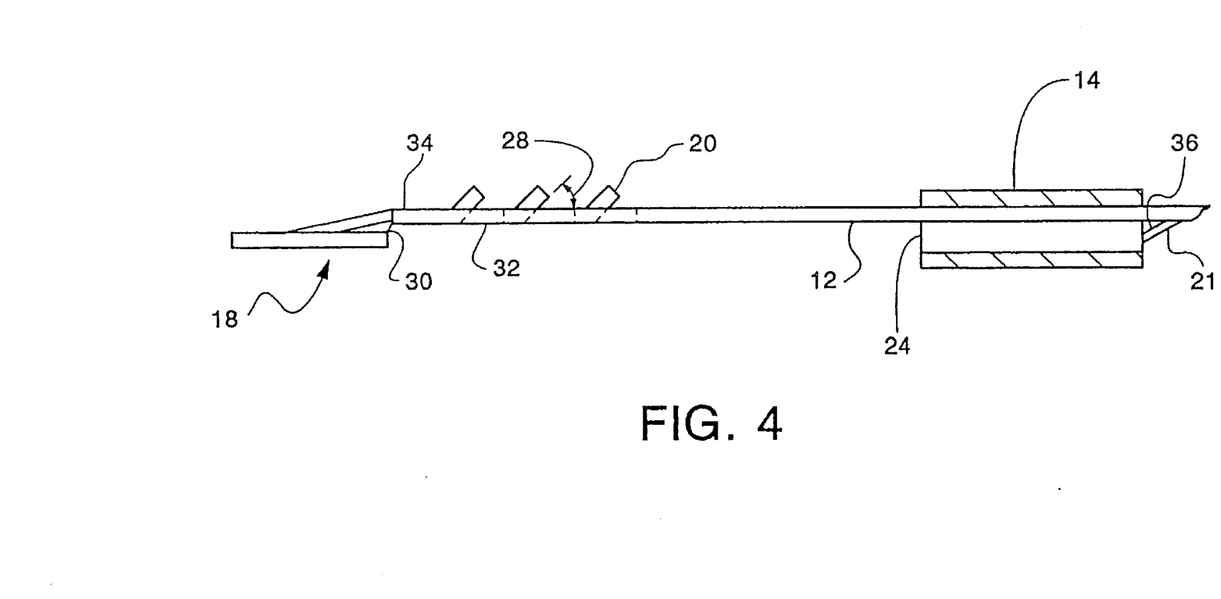
FIG. 4 is a side view of the second end of the band showing the locking teeth, steps, retaining tab and buckle.
Figure 5:
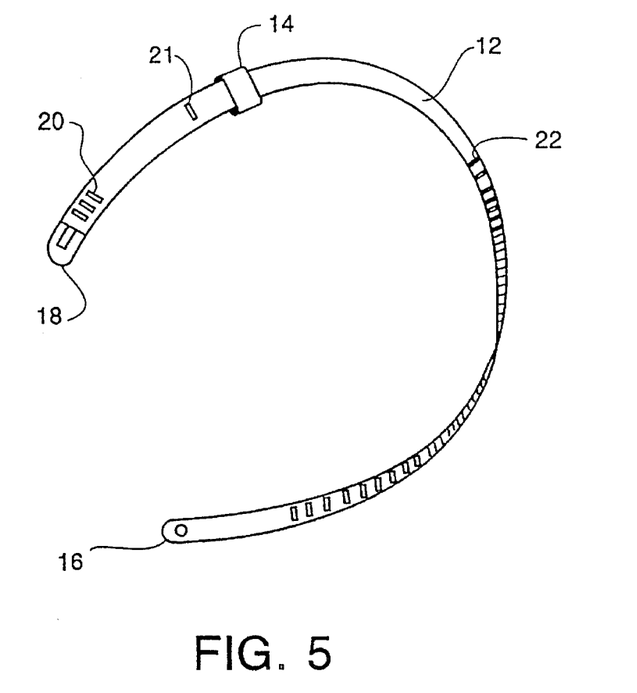
FIG. 5 is a perspective view of the clamping device after the buckle is positioned on the band.
Figure 6:
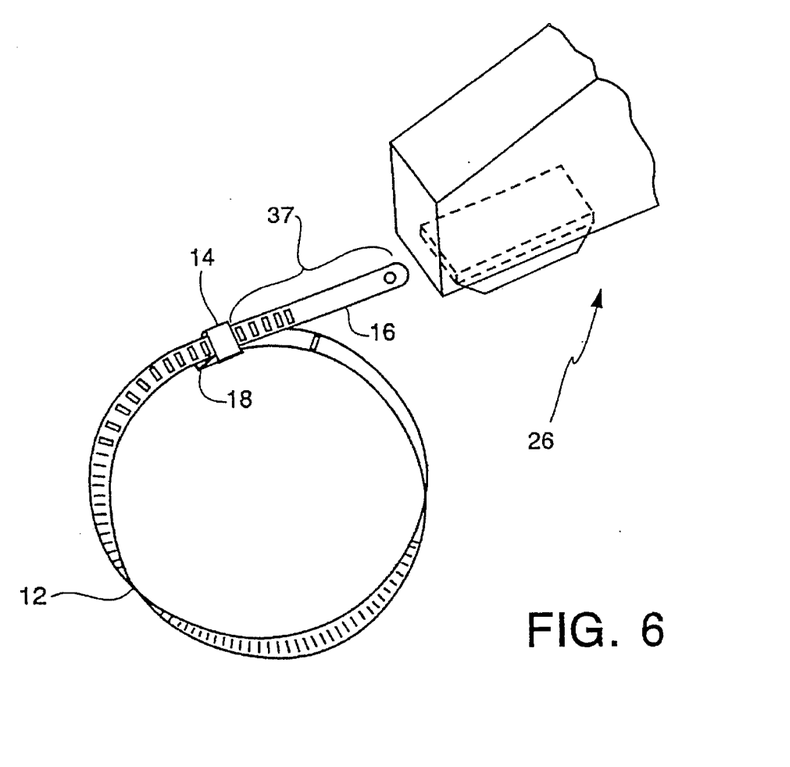
FIG. 6 is perspective view of the clamping device immediately prior to the free end of the band being inserted into the tightening tool.
Figure 7:
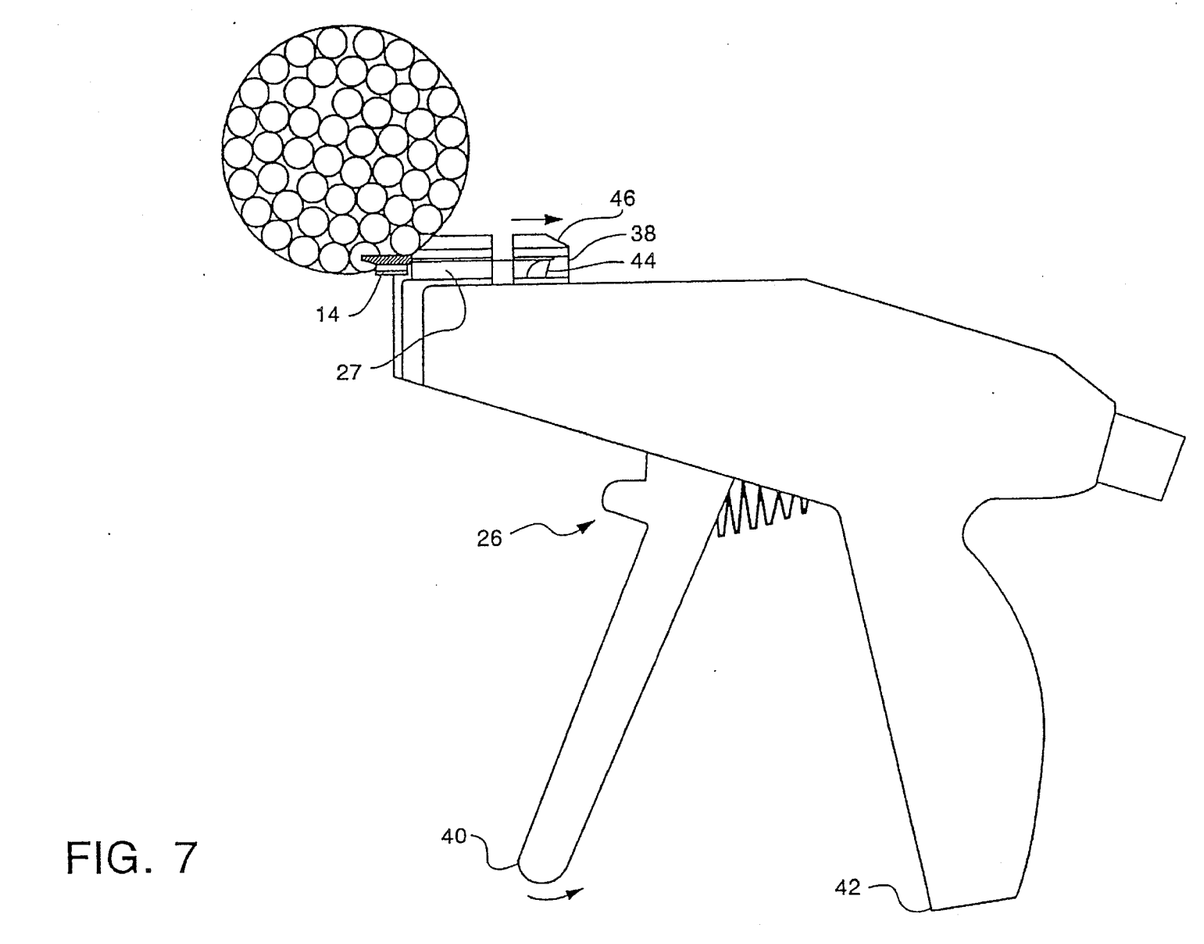
FIG. 7 is a side view of the tightening tool during tightening of the clamping device.

Referring to FIG. 1, the clamping device 10 of the present invention may be used to clamp a wide variety of objects 11. The clamping device 10 has particular utility in connection with clamping or fastening electrical cables, shielding or the like to a connector.

With reference to FIGS. 1 through 4, the clamping device 10 includes a substantially continuous band or strap 12 and a buckle 14 independent thereof. Unlike existing cable ties, the buckle 14 is substantially free of locking teeth. The band or strap 12 has first and second ends 16, 18, with the locking teeth 20, retaining tab 21, and the slots 22 to receive the locking teeth 20 disposed between the ends.

The unique design of the clamping device 10 facilitates the adjustment of the clamping device 10 to a desired band periphery. As discussed more fully below, the periphery of the band 12 is adjusted by inserting a section of the band 12 through the buckle 14 to yield a desired band periphery. Unlike existing cable ties, the locking teeth 20 of the clamping device 10 are in an unlocked position until the clamping device 10 is adjusted to the desired band periphery. After adjustment, the locking teeth 20 are placed in a locked position, and the buckle 14 is positioned over the locking teeth 20 to hold them in the locked position. Compared to existing cable ties, the unlocked position of the locking teeth 20 during band periphery adjustment significantly reduces the amount of force required to adjust the band periphery, enabling the band periphery to be adjusted by hand. The unlocked position of the locking teeth further enables the band periphery to be not only tightened but also loosened, as desired.

The buckle 14 is movably positioned on the band 12 to enable the locking teeth 20 to be disengaged during band periphery adjustment. The buckle 14 is movably positioned on the band 12 using a passage 24 extending through the buckle 14. To position the buckle 14 on the band 12, the first end 16 is passed through the passage 24 of the buckle 14.

To form the loop of the clamping device 10, the band 12 is inserted into the buckle 14 by passing the first end 16 through the passage 24 a second time. The passage 24 should have a size and shape sufficient to receive simultaneously not only one portion of band 12 from the buckle positioning step but also another portion of the band 12 from the loop forming step. To accomplish this, the passage 24 preferably has a height of at least 0.042 inches.

To enable additional band periphery adjustments when the buckle 14 is positioned over the locking teeth 20 in a locked position, the interior of the passage 24 should have a clearance over the locking teeth 20 sufficient for the band 12 to move over the locking teeth 20. In one embodiment, the clearance over the locking teeth 20 is at least one-half the thickness of the band 12. The flexibility of the locking teeth 20 coupled with the clearance permits the band 12 to be adjusted using a tightening tool 26 as described below. The clearance should be no more than one-half the thickness of the band 12 to prevent the band 12 from being released after band periphery adjustment. If the clearance is larger than one-half the band thickness, the locking teeth 20 may disengage from the slots 22, thereby releasing the clamping device 10.

The dimensions of the band 12 depend upon the size and shape of the object to be clamped and the compressive force to be exerted on the object by the clamping device 10. The width of the band 12 is preferably at least 0.25 inch and the thickness is preferably at least 0.01 inch. The length of the band 12 is sufficient to wrap about the object being constrained and provide an free end of the band 12 for the tightening tool 26 to grip onto.

The composition of the band 12 is preferably the same composition as the buckle 14. The band 12 and buckle 14 may be composed of any material having sufficient strength and flexibility to clamp the desired object. For example, the band 12 and buckle 14 can be composed of suitable metals or metal alloys, such as steel, or plastics.

The band 12 has at least one, and preferably a plurality of, locking teeth 20. Any number of locking teeth 20 may be employed depending upon the magnitude of the compressive force to be exerted by the clamping device 10 on the object. The locking teeth 20 are located near the second end 18. The spacing between the locking teeth 20 is preferably at least 0.05 inches.

The dimensions of the locking teeth 20 should be selected such that the portion of the band 12 containing the locking teeth 20 can be received within the passage 24 of the buckle 14 to permit the locking teeth 20 to be held in a locked position by the buckle 14. Accordingly, the locking teeth 20 have a height above the lower surface 32 of the band 12 that is no more than the height of the passage 24 less the clearance. The locking teeth 20 have a width that is no more than one-third the width of the band 12. The locking teeth 20 have a thickness substantially equivalent to the band thickness to provide flexibility of the locking teeth 20. As explained more fully below, the flexibility coupled with the clearance enables the band 12 to be moved through the buckle 14 to adjust the band periphery when the buckle 14 is in the locked position.

The band 12 has a plurality of slots 22 having a sufficient size, shape, and spacing to receive the locking teeth 20. The length, width, and depth of the slots 22 are at least equal to the length, width, and height of the locking teeth 20. The shape of the slots 22 is any shape suitable to receive the locking teeth 20. The spacing between the slots 22 is substantially equal to the spacing between the locking teeth 20. The number and placement of the slots 22 depends upon the desired periphery of the clamping device 10.

To improve the interlocking of the slots 22 and the locking teeth 20, each of the locking teeth 20 forms a first acute angle 28 with the band 12, with the first acute angle 28 facing away from the second end 18. The first acute angle 28 permits the locking teeth 20 to resist greater forces exerted on an object by the clamping device 10, compared to locking teeth that are substantially orthogonal to the band 12. The first acute angle 28 is preferably no more than 45°.

The band 12 has a preformed retaining tab 21 to restrict the movement of the buckle 14 along the band 12 during band periphery adjustment. The retaining tab 21 is extended downward from the band 12 after the buckle 14 is moved over the location of the retaining tab 21. The height of the retaining tab 21 should be sufficient to prevent the buckle 14 from moving over the retaining tab 21 towards the first end 16 during adjustment of the band periphery. The retaining tab 21 forms a second acute angle 36 with the band 12 facing the second end 18 to prevent the buckle 14 from moving over the retaining tab 21 towards the first end 16. The second acute angle 36 is preferably no more than about 45° to reduce the likelihood that the force of the buckle 14 against the retaining tab 21 during band periphery adjustment will break the retaining tab 21.

The second end 18 should have at least one dimension larger than a corresponding dimension of the passage 24 in the buckle 14 to restrain the second end 18 from passing through the passage 24. It is important for the second end 18 to hold the buckle 14 in position over the locking teeth 20. If the buckle 14 is not in position over the locking teeth 20, the locking teeth 20 may disengage from the slots 22, thereby releasing the object to be clamped. Accordingly, the dimension of the second end 18 that is larger than a corresponding dimension of the passage 24 is located substantially adjacent to the locking teeth 20.

The dimension of the second end 18, that is designed to hold the buckle 14 in position over the locking teeth 20, is embodied as steps 30 extending downward from the lower surface 32 of the band 12. The distance from the upper surface 34 of the band 12 to the top of the steps 30 is greater than the height of the passage 24. Since the height of the passage 24 is at least twice the band 12 thickness, the height of the step 30 is greater than the band thickness.

Having described the preferred embodiment of the invention, it is now necessary to describe the method of using the invention. With reference to FIGS. 1 to 7, the buckle 14 is positioned on the band 12 by inserting the first end 16 of the band 12 through the passage 24 of the buckle 14. The buckle 14 is moved over the location of the retaining tab 21 and positioned at a distance from the locking teeth 20 to enable the locking teeth 20 to be disengaged during band periphery adjustment. After the buckle 14 is moved over the location of the preformed retaining tab 21, the retaining tab 21 is moved downward to prevent the buckle 14 from moving over the retaining tab 21 towards the first end 16 during band periphery adjustment.

A loop in the band 12 is formed by inserting the first end 16 of the band 12 through the passage 24 of the buckle 14. During this step, the buckle 14 is maintained at a sufficient distance from the locking teeth 20 to permit the periphery of the band 12 to be adjusted, preferably by hand, by passing a portion of the band 12 through the buckle 14, preferably without contacting the locking teeth 20, to an initial desired periphery.

When the band 12 reaches the initial desired periphery, it may be necessary to attach the tightening tool 26 to the free end 37 of the band 12 to complete band periphery adjustment to a final desired band periphery. The tightening tool 26 is typically required where the object is to be tightly, and not loosely, clamped. To operate the tightening tool 26, the free end 37 is inserted into the gap 38 of the tightening tool 26. As the first handle 40 is moved towards the second handle 42 of the tightening tool 26, the band 12 is gripped by the gripper 44 and, through the movement of the band holder 46, is drawn through the gap 38 to decrease the band periphery. The locking teeth 20 are generally engaged while the tightening tool 26 is applied to the band 12.

During operation of the tightening tool 26, the buckle 14 is moved by the nose 27 of the tightening tool 26 towards the second end 18 and the locking teeth 20. In one embodiment, the tightening tool 26 causes the buckle 14 to move into position over the locking teeth 20 during adjustment of the band periphery. In another embodiment, the buckle 14 may be moved into a locked position before the free end 37 is inserted into the gap 38 of the tightening tool 26. In either embodiment, the band periphery is adjusted by the tightening tool 26 pulling the band 12 through the buckle 14. During adjustment, the slots 22 may interlock with the locking teeth 20.

When the final desired band periphery is realized, the buckle 14 is in position over the locking teeth 20. In this position, the buckle 14 generally contacts the steps 30 of the second end 18 to hold the buckle in position.

The fact that the locking teeth 20 can be disengaged permits the band periphery to be not only decreased but also increased. To increase the band periphery, the buckle 14 is moved away from the locking teeth 20, the locking teeth 20 are moved into an unlocked position, and the band 12 is moved back through the buckle 14 to enlarge the periphery of the band 12.

Following final positioning of the buckle 14 over the locking teeth 20, the tightening tool 26 is removed by severing the band 12 near the end 48 of the buckle 14. The band 12 can be severed by moving the tightening tool 26 in a manner that cuts off the free end 37 of the band 12 about the end 48 of the buckle 14.

Alternatively, all or a portion of the free end 37 of the band 12 may be left on the band 12 to permit the band periphery to be enlarged or the clamping device 10 removed and reused at a later time. To enlarge or remove the clamping device 10, the buckle 14 is moved towards the first end 16 of the band 12 to a sufficient distance from the locking teeth 20 to permit them to be disengaged from the slots 22. The locking teeth 20 are then disengaged and the band periphery increased, as desired. If desired, the first end 16 can be passed through the passage 24 of the buckle 14 to remove the loop in the clamping device 10, thereby returning the clamping device to the configuration illustrated in FIG. 5. In this configuration, the clamping device 10 can be reused.

Referring to FIGS. 8 to 19, other embodiments of the present invention are illustrated. Each of the embodiments has a two-piece band 12 as opposed to the preferred embodiment which is a one-piece, continuous band 12. As discussed below, in each of the alternative embodiments the second end 18 of the band 12 is removably connected to the band section 48, which is the remaining portion of the band 12.

The two-piece band 12 shown in FIGS. 8 to 19 has a length sufficient to provide a band periphery to clamp a selected object. The band section 48 is cut from a continuous length of band-forming material to a length sufficient to provide a band 12 having the desired periphery. The band-forming material is generally available as a roll. After the band section 48 is cut from the band-forming material, the second end 18 is connected to the band section 48 to form the band 12.

Figure 8:
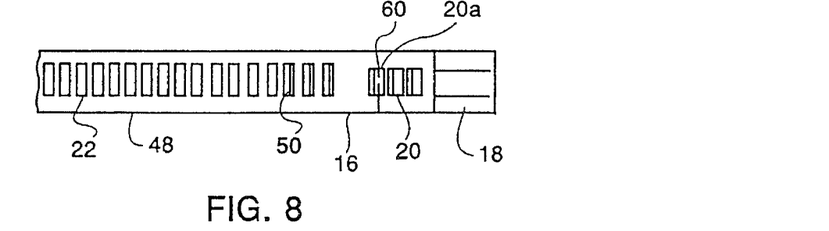
FIG. 8 is a plan view of one embodiment of the present invention showing the second end of the band connected to the band section.
Figure 9:
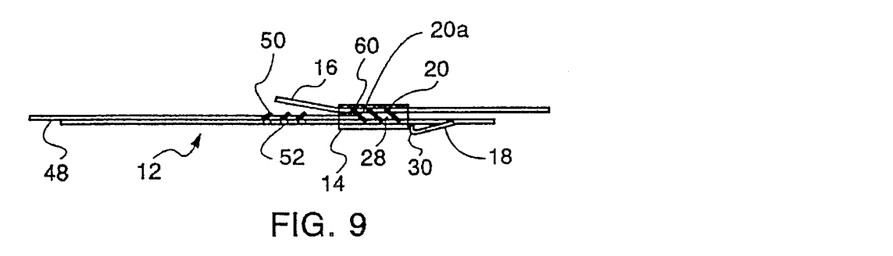
FIG. 9 is a side view of the embodiment with the buckle positioned over the locking teeth which are in a locked position.
Figure 10:
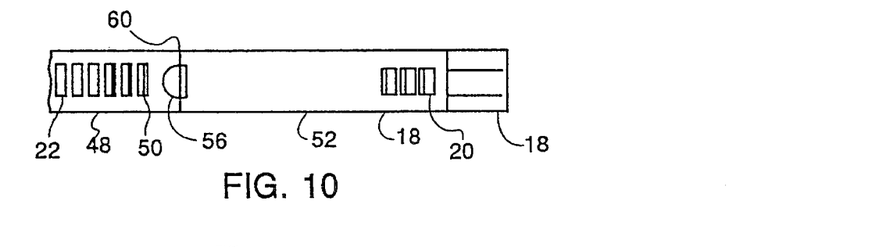
FIG. 10 is a plan view of another embodiment of the present invention showing the second end of the band connected to the band section.
Figures 11, 12:
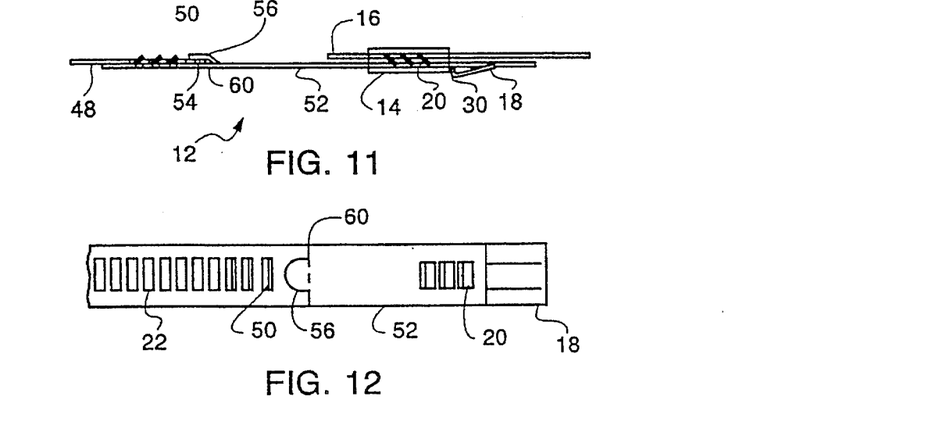
FIG. 11 is a side view of the embodiment with the buckle positioned over the locking teeth which are in a locked position.
FIG. 12 is a plan view of another embodiment of the present invention showing the second end of the band connected to the band section.
Figure 13:
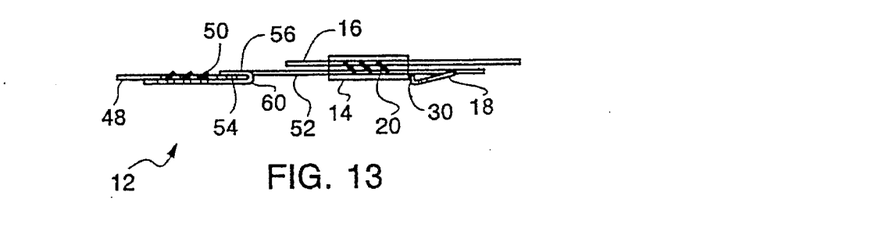
FIG. 13 is a side view of the embodiment with the buckle positioned over the locking teeth which are in a locked position.

Referring to FIGS. 8 and 9, one of the alternative embodiments is illustrated. The second end 18 of the band 12 is separate from the band section 48. The second end 18 includes not only locking teeth 20 and steps 30 as discussed above in connection with the preferred embodiment but also connecting teeth 50. The connecting teeth 50 form a third acute angle with an elongate portion 52 of the second end 18, with the first acute angle 28 facing the third acute angle between the connecting teeth 50 and the elongate portion 52.

To clamp an object, the band section end 60 is passed through the buckle 14. The second end 18 is then attached to the band section 48 to form the band 12. To attach the second end 18 to the band section 48, the band section end 60 is contacted with the nearest locking tooth 20 and the connecting teeth 50 are next engaged with the slots 22 in the band section 48. As will be appreciated, the first acute angle 28 of the nearest locking tooth 20a causes the locking tooth 20 to hold the band section end 60 in position against the elongate portion 52 of the second end 18.

After attaching the second end 18 to the band section 48, the first end 16 is passed through the buckle 14 to form a loop of a desired periphery. After formation of the loop, the buckle 14 is moved over the elongate portion 52 of the second end 18 to contact the steps 30. The first end 16 of the band 12 can be engaged with the tightening tool 26 to decrease further the periphery of the band 12 as discussed above in connection with the preferred embodiment.

Further embodiments of the present invention are illustrated in FIGS. 10 through 13. Like the embodiment depicted in FIGS. 8 and 9, the band 12 in these embodiments has a separate band section 48 and second end 18, with the second end 18 having locking and connecting teeth 20, 50, steps 30, and an elongate portion 52. Each of the embodiments in FIGS. 10 through 13 also include a pocket 54 formed by a tab 56 and the elongate portion 52. The pocket 54 is of a size and shape sufficient to receive the band section end 60.

To clamp an object, the buckle 14 is positioned on the band section 48 and the second end 18 is then attached to the band section 48. To attach the second end 18 to the band section 48, the band section end 60 is contacted with an interior surface of the pocket 54 and the connecting teeth 50 are engaged with the slots 22 of the band section 48. As will be appreciated, the interior surface of the tab 56 holds the band section end 60 in position against the elongate portion 52 of the second end 18. The remaining steps of the clamping procedure are the same as those discussed above in connection with the embodiment shown in FIGS. 8 and 9.

Figure 14:
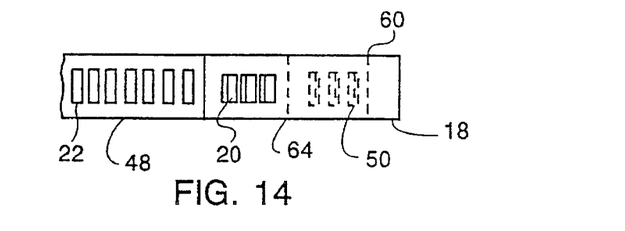
FIG. 14 is a plan view of another embodiment of the present invention showing the second end of the band connected to the band section.
Figure 15:
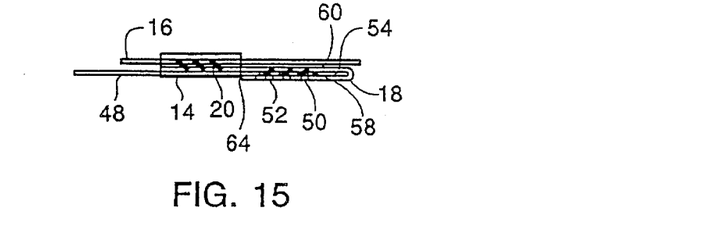
FIG. 15 is a side view of the embodiment with the buckle positioned over the locking teeth which are in a locked position.

Yet another embodiment is illustrated in FIGS. 14 and 15. This embodiment also includes a second end 18 having locking and connecting teeth 20, 50, an elongate portion 52, and a pocket 54. Unlike the other embodiments, the pocket 54 is formed by bending the elongate portion 52 back onto itself. The gap 58 between the connecting teeth 50 and elongate portion 52 should be a sufficient to receive the end of the band section 48.

The operation of the embodiment illustrated in FIGS. 14 and 15 differs from that of the embodiments illustrated in FIGS. 10 through 13 in certain respects. As described above, the buckle 14 is positioned on the band section 48 before attachment of the second end 18 to the band section 48. The band section end 60 is then moved into the pocket 54. Preferably, the connecting teeth 50 have sufficient flexibility to enable the band section 48 to be moved in the gap 58 between the elongate portion 52 and the connecting teeth 50. After the slots 22 in the band section 48 are engaged with the connecting teeth 50, the first end 16 is passed through the buckle 14 to form a loop of a desired periphery. The buckle 14 is then contacted with a lower face 64 of the second end 18, which prevents the buckle 14 from moving over the second end 18. The remaining steps of the clamping procedure are the same as those discussed above in connection with the embodiment in FIGS. 8 and 9.

Figure 16:
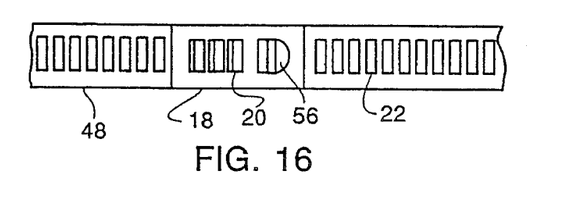
FIG. 16 is a plan view of another embodiment of the present invention showing the second end of the band connected to the band section.
Figure 17:
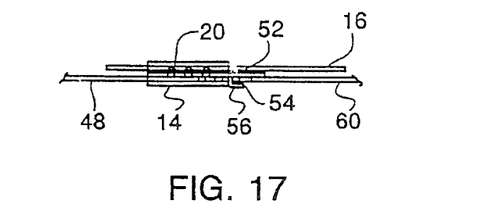
FIG. 17 is a side view of the embodiment with the buckle position over the locking teeth which are in a locked position.

Yet another embodiment is depicted in FIGS. 16 and 17. In this embodiment, the second end 18 has no connecting teeth. The second end 18 is connected to the band section 48 by means of a pocket 54 formed between the elongate portion 52 and tab 56. To form the band 12, the tab 56 is engaged with a slot 22. Unlike the prior embodiments this embodiment may be engaged with the band section 48 in any of the slots 22 along the length of the band section 48. This feature allows the band periphery of the clamping device 10 to be preadjusted before the clamping device 10 is placed around the object to be clamped. The steps of the clamping procedure are the same as those discussed above in connection with the embodiment illustrated in FIGS. 8 and 9.

Figure 18:
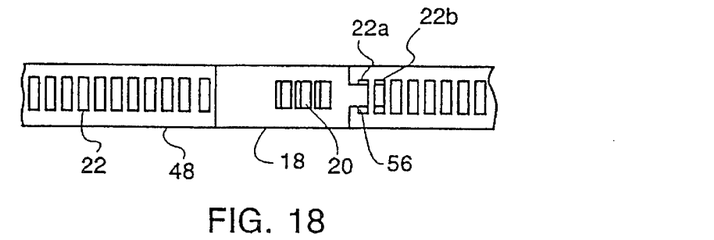
FIG. 18 is a plan view of another embodiment of the present invention showing the second end of the band connected to the band section.
Figure 19:
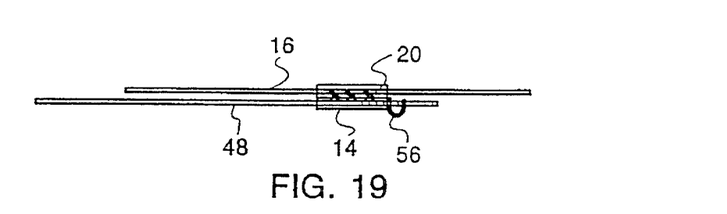
FIG. 19 is a side view of the embodiment with the buckle positioned over the locking teeth which are in a locked position.

Yet another embodiment is depicted in FIGS. 18 and 19. This embodiment resembles the embodiment illustrated in FIGS. 16 and 17 except for the design of the tab 56. Unlike the embodiment illustrated in FIGS. 16 and 17, the tab 56 in FIG. 19 is in the shape of a hook. The hook is able to engage two adjacent slots 22 simultaneously to provide a more stable connection between the second end 18 and the band section 48 than the connection in the embodiment illustrated in FIGS. 16 and 17. To attach the second end 18 to the band section 48, the hook is passed through the first slot 22a and then through the second slot 22b. The steps of the clamping procedure are otherwise the same as those discussed above in connection with the embodiment shown in FIGS. 16 and 17.

The fact that the present invention has been described with reference to particular embodiments does not mean that other embodiments do not exist. It should be appreciated that many other embodiments can be provided within the spirit and scope of this invention.

What is claimed is:

1. A clamping device having a band for facilitating an adjustment of a band periphery, comprising:

a band having a first end and a second end with locking teeth disposed therebetween; and a buckle positioned on said band and having at least a first and second position, said buckle further having a passage extending therethrough of a size and shape sufficient to receive said band;

wherein, when said buckle is in said first position, said band periphery is adjusted by inserting a portion of said band through said buckle to yield a desired band periphery and said locking teeth are in an unlocked position until said band is adjusted to said desired band periphery, and when said buckle is in said second position, a clearance is defined between a position of said passage and said locking teeth, and said clearance enables said band to be moved through said buckle to decrease said band periphery when said buckle is positioned over said locking teeth while preventing increasing of said band periphery when said buckle is positioned over said locking teeth.

2. The clamping device as claimed in claim 1, wherein: said locking teeth are located near said second end.

3. The clamping device as claimed in claim 1, wherein: said band is substantially continuous.

4. The clamping device as claimed in claim 1, wherein: said band comprises a slot of a sufficient size and shape to receive therein at least one of said locking teeth.

5. The clamping device as claimed in claim 4, wherein: said band has a plurality of said slots.

6. The clamping device as claimed in claim 5, wherein: at least one of said locking teeth forms an acute angle with said band and said acute angle faces away from said second end to enable said locking teeth to engage said plurality of slots.

7. The clamping device as claimed in claim 1, wherein: said band comprises at least two removably interconnected segments, a first segment including said first end and a second segment including said second end and said locking teeth.

8. The clamping device as claimed in claim 7, further comprising:

an object to be clamped by said clamping device; and a continuous length of a band-forming material;

and wherein:

said desired band periphery is based on the size of said object; and said first segment is cut from said band-forming material to a length sufficient to form a clamping device having said desired band periphery.

9. The clamping device as claimed in claim 1, wherein: said buckle is movably positioned on said band.

10. The clamping device as claimed in claim 1, wherein: said buckle substantially encompasses the periphery of said band.

11. The clamping device as claimed in claim 1, wherein: said buckle is substantially free of locking teeth.

12. The clamping device as claimed in claim 1, wherein: said buckle is independent of said band.

13. The clamping device as claimed in claim 1, wherein: when said buckle is in said first position on said band, said band portion passes through said buckle without contacting said locking teeth.

14. The clamping device as claimed in claim 13, wherein: when said buckle is in a second position on said band, said buckle overlaps said locking teeth while said locking teeth are in a locked position.

15. The clamping device as claimed in claim 1, wherein: said passage is of a size and shape sufficient to receive simultaneously two overlapping portions of said band.

16. The clamping device as claimed in claim 1, wherein: said second end has restraining means for holding said buckle in a first position proximate said locking teeth such that when said locking teeth are in an unlocked position said band periphery may be manually adjusted, and for holding said buckle in a second position and restraining movement of said second end of said band through said buckle passage while allowing movement of said first end of said band through said buckle passage when said band periphery is subject to mechanical tightening.

17. The clamping device of claim 16 wherein:

in said second position of said buckle on said band, said buckle overlaps said locking teeth while said locking teeth are in a locked position and said buckle contacts at least a portion of said restraining means.

18. The clamping device as claimed in claim 16, wherein: said means for restraining is substantially adjacent to said locking teeth.

19. The clamping device as claimed in claim 16, wherein: said restraining means comprises a portion of said second end having a dimension larger than a corresponding dimension of said passage in said buckle to restrain said second end from passing through said passage.

20. The clamping device as claimed in claim 11, wherein: said band includes means for restraining the movement of said first end through said buckle passage.

21. A method for clamping an object, comprising:

providing a band having a first end and a second end with locking teeth disposed therebetween;

providing a buckle having a passage extending through said buckle of a size and shape sufficient to receive therein said band;

positioning said buckle on said band;

locating said band and said buckle adjacent an object to be clamped;

placing said first end of said band around said object and through said buckle to define an overlapping portion of said band;

moving said buckle to a first position on said overlapping portion of said band;

adjusting a periphery of said band through said buckle, wherein said locking teeth are in an unlocked position until said band is adjusted to a desired periphery;

moving said buckle to a second position on said overlapping portion of said band over said locking teeth, wherein a clearance is defined between a position of said passage and said locking teeth; and, tightening said band periphery, wherein said clearance enables said band to be moved through said buckle to decrease said band periphery while preventing increasing of said band periphery.

22. The method as claimed in claim 21, wherein said providing a band step comprises:

determining a desired band periphery for said band based on the size of said object;

cutting a band-forming material to a length sufficient to provide a band having said periphery; and attaching said second end to said length of band-forming material to form said band having a first end and a second end.

23. The method as claimed in claim 21, wherein said positioning step comprises:

passing said band through said buckle;

moving said buckle over a retaining tab; and positioning said retaining tab to prevent movement of said buckle towards said first end.

24. The method as claimed in claim 21, wherein:

in said positioning step said buckle is positioned at a distance from said locking teeth.

25. The method as claimed in claim 23, wherein:

said band comprises at least one slot;

and wherein said second moving step comprises:

inserting said locking teeth into said slot in said band to place said locking teeth in a locked position; and after said inserting step, moving said buckle to overlap said locking teeth to maintain said locking teeth in a locked position.

26. The method as claimed in claim 23, wherein:

said second moving step comprises contacting said buckle with a portion of said second end that has a dimension larger than a corresponding dimension of said passage to prevent said second end from passing through said buckle passage.

27. The method as claimed in claim 21, further comprising:

after said adjusting step, removing said band from said object by relocating said buckle on said band.

28. The method as claimed in claim 27, wherein said removing step comprises:

locating said buckle a distance from said locking teeth;

disengaging said locking teeth to an unlocked position; and passing said first end of said band through said buckle to unclamp said object.

* * * * *